(12) United States Patent
Matsuda et al.

(10) Patent No.: US 6,404,076 B1
(45) Date of Patent: Jun. 11, 2002

(54) DC-DC CONVERTER CIRCUIT SELECTING LOWEST ACCEPTABLE INPUT SOURCE

(75) Inventors: Kouichi Matsuda; Mitsuo Saeki; Hidekiyo Ozawa, all of Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/690,023

(22) Filed: Oct. 17, 2000

(30) Foreign Application Priority Data

Feb. 22, 2000 (JP) ........................................ 2000-044091

(51) Int. Cl.[7] .................................................. H02J 3/00
(52) U.S. Cl. ........................................... 307/80; 307/82
(58) Field of Search .............................. 307/80, 81, 82, 307/75, 66, 85

(56) References Cited

U.S. PATENT DOCUMENTS 5,703,415 A * 12/1997 Tanaka ......................... 307/66
6,057,609 A * 5/2000 Nagai et al. .................. 307/66

FOREIGN PATENT DOCUMENTS

| JP | 9-182288 | 7/1997 |
| JP | 9-308102 | 11/1997 |

* cited by examiner

*Primary Examiner*—Shawn Riley
(74) *Attorney, Agent, or Firm*—Armstrong, Westerman & Hattori, LLP.

(57) ABSTRACT

In a DC-DC converter circuit having a plurality of input terminals connected to a plurality of DC power supplies, and an output terminal, the DC-DC converter circuit includes a power supply selection section for selecting a DC power supply of lowest voltage on the condition that the voltage is not less than a predetermined voltage, and a step-down type of regulator section for converting the voltage of the DC power supply selected by the power supply selection section into a predetermined voltage lower than the voltage of the DC power supply selected by the power supply selection section, and outputting the converted voltage through the output terminal.

14 Claims, 9 Drawing Sheets

DC-DC CONVERTER CIRCUIT SELECTING LOWEST ACCEPTABLE INPUT SOURCE

BACKGROUND OF THE INVENTION

1. Field of the Invention

The present invention relates to a DC-DC converter circuit for converting DC voltage to another DC voltage, a power supply selection circuit for selecting one of a plurality of power supplies, and an apparatus provided with such a DC-DC converter circuit.

2. Description of the Related Art

Many of portable type of electronic apparatuses such as a note personal computer and the like are so arranged that they operate from electric power obtained from a commercial power supply and a battery incorporated therein as well.

Usually, such an apparatus incorporates therein a circuit for changing over as to which source of electric power, the commercial power supply or the battery, is used to operate the apparatus (for example, Japanese Patent Laid Open Gazette Hei.9-182288, and Japanese Patent Laid Open Gazette Hei.9-308102). According to such type of circuit, when electric power obtained from the commercial power supply is supplied to the apparatus, this electric power takes precedence in use, and when the circuit detects that the supply of power from the commercial power supply stops, the supply of power changes to the supply of power from the battery. As another type of the power supply switching circuit, a circuit is arranged in such a manner that, in view of the fact that electric power obtained from the commercial power supply is generally higher in voltage than that from the battery, the supply of power selected is from the electric power of the highest voltage of the plurality of electric powers.

Incidentally, the voltage of a battery decreases as the battery discharges. Thus, an apparatus is provided with a DC-DC converter circuit for maintaining the voltage of electric power used in the apparatus.

FIG. 7 is a circuit diagram showing a first example of a linear regulator. The linear regulator is one type of a DC-DC converter circuit, and it is generally widely used.

A linear regulator section 10 is loaded on an LSI having an input terminal IN through which electric power of input voltage Vin is applied. The linear regulator section 10 converts the electric power of the input voltage Vin to electric power of output voltage Vout (Vin>Vout) lower than the input voltage Vin, and outputs electric power of the output voltage Vout through an output terminal OUT.

Between the input terminal IN and the output terminal OUT, an NPN transistor 11 for output voltage control is disposed, and between the input terminal IN and a base of the NPN transistor 11, a constant current source 12 is disposed. A current outputted from the constant current source 12 flows through the base of the NPN transistor 11 in the form of a base current thereof, and further flows through a collector of an additional NPN transistor 13 in the form of a collector current thereof. An emitter of the NPN transistor 13 is connected to a ground terminal GND, which is grounded. The output voltage Vout of the output terminal OUT is fed to a plus input terminal of a differential amplifier 16 in the form of a potential division by two resistances 14 and 15, while a reference voltage generated by a reference voltage source 17 is fed to a minus input terminal of the differential amplifier 16. An output terminal of the differential amplifier 16 is connected to a base of the NPN transistor 13.

In the event that the output voltage Vout of the output terminal OUT is biased with a voltage higher than a predetermined reference output voltage, the output voltage of the differential amplifier 16 increases, so that a collector current of the NPN transistor 13 increases. That is, of the current outputted from the constant current source 12, one used as the collector current of the NPN transistor 13 increases, and as a result, the base current of the NPN transistor 11 for output voltage control decreases and thereby the output voltage Vout of the output terminal OUT decreases.

Conversely, in the event that the output voltage Vout of the output terminal OUT is biased with a voltage lower than a predetermined reference output voltage, the output voltage of the differential amplifier 16 decreases, so that the collector current of the NPN transistor 13 also decreases. That is, the base current of the NPN transistor 11 increases and thereby the output voltage Vout of the output terminal OUT increases.

In this manner, the electric power of a constant output voltage Vout is outputted from the output terminal OUT.

FIG. 8 is a circuit diagram showing a second example of a linear regulator. The following description sets forth the differences from the first example of the linear regulator shown in FIG. 7, hereinafter.

A linear regulator 10' shown in FIG. 8 is provided with a PNP transistor 18 for output voltage control, instead of the NPN transistor 11 for output voltage control in the linear regulator 10 shown in FIG. 7. As a result, the output voltage Vout of the output terminal OUT is fed to the minus input terminal of the differential amplifier 16 in form of a potential division by two resistances 14 and 15, while the reference voltage generated by the reference voltage source 17 is fed to the plus input terminal of the differential amplifier 16.

In the event that the output voltage Vout of the output terminal OUT is biased with a voltage higher than a predetermined reference output voltage, the output voltage of the differential amplifier 16 decreases, so that a collector current of the NPN transistor 13 also decreases. That is, of the current outputted from the constant current source 12, one used as the collector current of the NPN transistor 13 decreases, and as a result, the base current of the PNP transistor 18 decreases and thereby the output voltage Vout of the output terminal OUT decreases.

Conversely, in the event that the output voltage Vout of the output terminal OUT is biased with a voltage lower than a predetermined reference output voltage, the output voltage of the differential amplifier 16 increases, so that the collector current of the NPN transistor 13 also increases. That is, the base current of the PNP transistor 18 increases and thereby the output voltage Vout of the output terminal OUT increases.

In this manner, an electric power of a constant output voltage Vout is outputted from the output terminal OUT.

FIG. 9 is a circuit diagram showing a third example of a linear regulator.

A main difference from the second example of the linear regulator shown in FIG. 8 is that the PNP transistor 18 is replaced by P channel MOS transistor 19. With respect to circuit operation, it is the same as that of the second example shown in FIG. 8, and thus a redundant explanation will be omitted.

FIG. 10 is a circuit diagram showing an example of a switching regulator. The switching regulator 20 is also a type of DC-DC converter circuit, and it is generally widely used.

An electric power of voltage Vin is fed through an input terminal IN of the switching regulator, and an electric power of output voltage Vout (here dealing with a step-down type and thus Vin>Vout) is outputted from a second output terminal OUT 2, of first and second output terminals OUT 1 and OUT 2. Between the first and second output terminals OUT 1 and OUT 2, an outside coil 31 is connected. Between the second output terminals OUT 2 and the ground, an outside capacitor 32 is connected.

Elements of the switching regulator 20, except outside coil 31 and outside capacitance 32, are loaded on an LSI.

Between the input terminal IN and the output terminal OUT 1, P channel MOS transistor 21 is disposed. An output of a PWM comparator 26 is connected to a gate of the P channel MOS transistor 21. An output of a differential amplifier 24 and an output of a triangle wave generator 27 are fed to the PWM comparator 26. The PWM comparator 26 will be described later.

The voltage Vout of the second output terminal OUT2 is fed to a minus input terminal of the differential amplifier 24 in form of a potential division by two resistances 22 and 23, while a reference voltage generated by a reference voltage source 25 is fed to a plus input terminal of the differential amplifier 24. Between the first output terminal OUT 1 and a ground terminal GND which is grounded, a diode 28 is connected. A cathode of the diode 28 is connected to the first output terminal OUT 1, and an anode of the diode 28 is connected to the ground terminal GND.

The PWM comparator 26 compares an output voltage of the differential amplifier 24 with a triangle wave signal outputted from the triangle wave generator 27. When the output voltage of the differential amplifier 24 is lower in voltage than the triangle wave signal, the PWM comparator 26 generates a pulse signal of 'H' level. When the output voltage of the differential amplifier 24 is higher in voltage than the triangle wave signal, the PWM comparator 26 generates a pulse signal of 'L' level. Such a pulse signal is fed to the gate of the MOS transistor 21, so that the MOS transistor 21 turns on or off in accordance with the variation between the 'H' level and the 'L' level of the pulse signal. That is, the MOS transistor 21 switches the input voltage Vin at the same repetitive frequency as that of the triangle wave signal.

The diode 28, the coil 31 and the capacitor 32 smooth the input voltage Vin after the switching and generate the output voltage Vout.

When the output voltage Vout slightly exceeds a set up voltage, the output voltage of the differential amplifier 24 decreases, so that a pulse width (a pulse width of the 'L' level) of the pulse signal generated by the PWM comparator 26 narrows slightly and thereby the output voltage Vout decreases. Conversely, when the output voltage Vout decreases, the output voltage of the differential amplifier 24 increases, so that a pulse width (a pulse width of the 'L' level) of the pulse signal generated by the PWM comparator 26 expands and thereby the output voltage Vout increases. Thus, the switching regulator 20 controls the electric power of a constant voltage Vout to be outputted.

SUMMARY OF THE INVENTION

In an electronic apparatus, for example, a personal computer, there is frequently a case that a plurality of circuit units, operative with mutually different DC voltages, exist in the apparatus. Such an apparatus has a plurality of DC-DC converter circuits which output electric powers of individual voltages, respectively. A DC-DC converter circuit is associated with such disadvantages that a great deal of useless electric power is consumed for conversion of DC voltage, and as a result, the consumption of battery charge is hastened, and also this is associated with a temperature rise of the apparatus. For example, in case of the DC-DC converter circuit of the linear regulator scheme shown in FIGS. 7 to 9, for conversion from the input voltage of 16 volts into the output voltage of 3.3 volts, the conversion efficiency is 20%, and the remaining 80% is a power loss. Particularly, in an apparatus in which a plurality of mutually different DC voltages are used and a plurality of DC-DC converter circuits are needed in order to generate the plurality of mutually different DC voltages, it is a problem as to how the conversion efficiency is improved in the DC-DC converter circuits.

In view of the foregoing, it is an object of the present invention to provide a DC-DC converter circuit improved in conversion efficiency, a power supply selection circuit in which an existing DC-DC converter circuit is used to perform a voltage conversion improved in conversion efficiency, and an apparatus incorporated thereinto such a DC-DC converter circuit improved in conversion efficiency.

To achieve the above-mentioned objects, the present invention provides a first DC-DC converter circuit having a plurality of input terminals connected to a plurality of DC power supplies, respectively, and an output terminal. This DC-DC converter circuit has a power supply selection section for selecting the DC power supply of the lowest voltage on the condition that the voltage is not less than a predetermined voltage. This DC-DC convert or circuit also has a step-down type of regulator section for converting the voltage of the DC power supply selected by the power supply selection section into a predetermined voltage lower than the voltage of the DC power supply selected by the power supply selection section, and outputting the converted voltage through the output terminal.

As mentioned above, in case of the DC-DC converter circuit according to the linear regulator scheme, the conversion efficiency is 20% for a conversion of 16 V to 3.3 V. Conversely, in a case where a power supply of 5 V exists, the conversion efficiency is 66% for the same conversion. In this manner, when an output voltage is obtained from an input voltage which is close to the output voltage as much as possible, it is possible to greatly improve the conversion efficiency. This is applicable also to the switching regulator scheme as well as the linear regulator scheme.

The first DC-DC converter circuit according to the present invention utilizes this principle as mentioned above.

That is, the power supply selection section selects a DC power supply of the lowest voltage from among a plurality of DC power supplies, and transmits the selected DC power supply to the regulator section. However, in this case, in order to avoid such a situation that the lowest detected voltage is when no power supply is connected, or the connected power supply is not operative, so that the lowest voltage is 0 V, there is a requirement that the lowest voltage is not less than a predetermined voltage. The regulator section converts the voltage of the DC power supply thus selected to a DC voltage lower than the voltage of the selected DC power supply. Thus, it is possible to implement high efficiency voltage conversion wherein the optimum power supply is selected in accordance with the state of the power supplies.

To achieve the above-mentioned objects, the present invention provides a second DC-DC converter circuit having a first input terminal connected to a predetermined first DC power supply, a second input terminal connected to a predetermined second DC power supply of a voltage lower than that of the first DC power supply, and an output terminal. This DC-DC converter circuit has a power supply selection section for selecting the first DC power supply connected to the first input terminal and the second DC power supply connected to the second input terminal, the voltage of the second DC power supply being less than a predetermined voltage or is not less than the predetermined voltage, respectively. This DC-DC converter circuit also has a step-down type of regulator section for converting the voltage of the DC power supply selected by the power supply selection section into a predetermined voltage lower than the voltage of the DC power supply selected by the power supply selection section, and outputting the converted voltage through the output terminal.

In the event that it is decided that, as compared with the voltage of the first DC power supply entered through the first input terminal, the voltage of the second DC power supply entered through the second input terminal is lower, or it is arranged in such a manner as mentioned above on a connection basis, it is possible to simplify the power supply selection section in structure taking into account the idea of the first DC-DC converter circuit of the present invention.

In either of the first and second DC-DC converter circuits according to the present invention, it is acceptable that the regulator section have a linear regulator. In this case, it is preferable that the power supply selection section and the regulator section having the linear regulator are arranged in a chip of an integrated circuit. Or alternatively, it is preferable that the power supply selection circuit and portions of the regulator section having the linear regulator, except for an output voltage control transistor, are arranged in a chip of an integrated circuit.

In any of the first and second DC-DC converter circuits according to the present invention, it is acceptable that the regulator section have a switching regulator. In this case, it is preferable that the power supply selection section and portions of the regulator section having the switching regulator, except for a voltage smoothing circuit portion which is to be disposed outside, are arranged in a chip of an integrated circuit.

Arrangement in a chip of an integrated circuit makes possible a more stable operation, cost-reduction, and space saving.

To achieve the above-mentioned objects, there is provided a first power supply selection circuit having a plurality of input terminals connected to a plurality of DC power supplies; a power supply selection section for selecting a DC power supply of the lowest voltage, on the condition that the voltage is not less than a predetermined voltage, from among the plurality of DC power supplies; and an output terminal for outputting the voltage of the DC power supply selected by the power supply selection section.

To achieve the above-mentioned objects, there is provided a second power supply selection circuit having a first input terminal connected to a predetermined first DC power supply; a second input terminal connected to a predetermined second DC power supply of which the voltage is lower than the voltage of the first DC power supply; a power supply selection section for selecting the first DC power supply connected to the first input terminal and the second DC power supply connected to the second input terminal according to the voltage of the second DC power supply being less than a predetermined voltage or is not less than the predetermined voltage, respectively; and an output terminal for outputting the voltage of the DC power supply selected by the power supply selection section.

The first and second power supply selection circuits correspond to the power supply selection sections of the first and second DC-DC converter circuits, respectively. The DC-DC converter circuits corresponding to the regulator sections of the first and second DC-DC converter circuits are connected to the later stages of the first and second power supply selection circuits, respectively. This feature makes it possible to perform a highly efficient DC-DC conversion for the DC-DC converter circuits.

To achieve the above-mentioned objects, there is provided an apparatus operative upon receipt of an electric power having a step-down type of first DC-DC converter for converting a first DC voltage of a predetermined first DC power supply into a predetermined second DC voltage lower than the first DC voltage of the first DC power supply; a first operating circuit operative upon receipt of supply of an electric power of the second DC voltage obtained by the first DC-DC converter; a second DC-DC converter having a step-down type of regulator section for converting a received DC voltage into a predetermined third DC voltage lower than the received DC voltage, and a power supply selection section responsive to both the first DC voltage of the first DC power supply and an output of the first DC-DC converter for selectively transmitting to the regulator section the output of the first DC-DC converter and the first DC voltage of the first DC power supply according as the output of the first DC-DC converter is not less than a predetermined voltage or is less than the predetermined voltage, respectively; and a second operative circuit operative upon receipt of electric power supplied by the third DC voltage obtained by the second DC-DC converter.

The apparatus of the present invention as mentioned above is provided with two DC-DC converters of the first and second DC-DC converters. The second DC-DC converter, which outputs the lower DC voltage, is arranged with the first or second DC-DC converter circuit. This feature makes it possible to perform a DC-DC conversion excellent in efficiency, and also to implement a reduction of the consumed power and a suppression of temperature increase of the apparatus.

Generally, power supply systems are wired within apparatuses beforehand, and therefore the arrangement of the second DC-DC converter circuit of the present invention is generally used as the second. DC-DC converter. However, it is acceptable that the first DC-DC converter circuit of the present invention is used as the second DC-DC converter. At that time, the power supply selection section of the second DC-DC converter serves to block both the path for transmitting the output of the first DC-DC converter to the regulator section and the path for transmitting the voltage of the first DC power supply to the regulator section, when the first DC power supply is less than a predetermined voltage, in the event that the output of the first DC-DC converter is less than a predetermined voltage.

DETAILED DESCRIPTION OF PREFERRED EMBODIMENTS

Embodiments of the present invention will be described with reference to the accompanying drawings.

Figure 1:
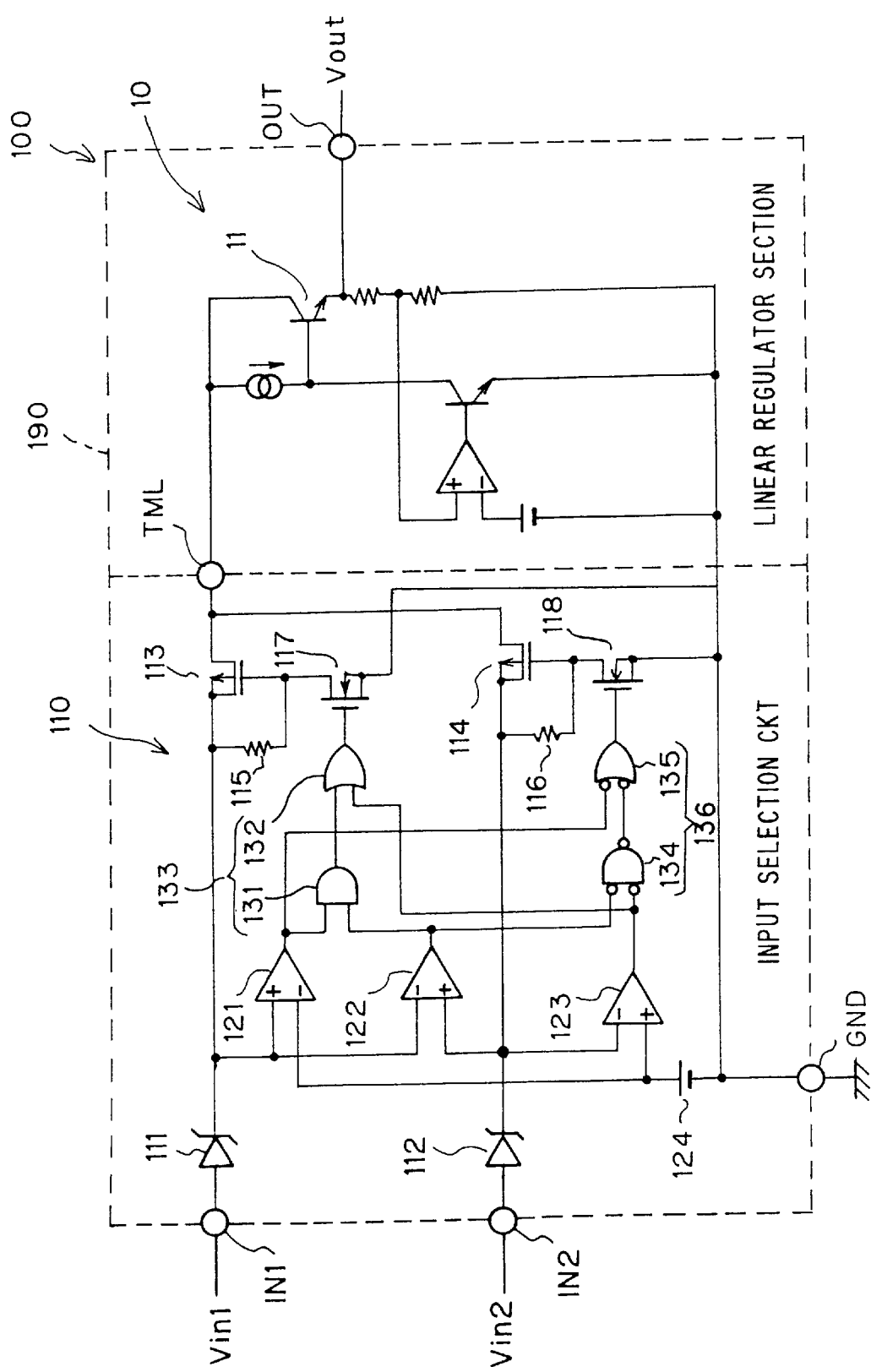
FIG. 1 is a circuit diagram of a first embodiment of a DC-DC converter circuit according to the present invention, including a first embodiment of a power supply selection circuit according to the present invention.

FIG. 1 is a circuit diagram of a first embodiment of a DC-DC converter circuit according to the present invention, including a first embodiment of a power supply selection circuit according to the present invention.

A DC-DC converter circuit 100 shown in FIG. 1 comprises an input selection circuit 110 and a linear regulator 10. The DC-DC converter circuit 100 is loaded onto a one LSI chip 190 in its entirety. The input selection circuit 110 is an embodiment of a power supply selection circuit of the present invention.

The input selection circuit 110 is provided with two input terminals IN1 and IN2 to which DC supplies are connected, respectively. Input voltages Vin1 and Vin2 are applied through the input terminals IN1 and IN2, respectively.

Between the input terminals IN1 and IN2 and a node TML for transferring signals from the input selection circuit 110 to the linear regulator section 10, wherein in the event that the input selection circuit 110 is constructed in the form of a circuit separated from the linear regulator section 10 (for example, only the input selection circuit 110 is loaded onto an LSI), the node TML is an output terminal of the input selection circuit 110, diodes 111 and 112 of which anodes are connected to the input terminals IN1 and IN2, respectively, and P channel MOS transistors 113 and 114 are disposed. Input sides of the P channel MOS transistors 113 and 114 are connected via resistances 115 and 116 to their gates, respectively. Between the gates of the P channel MOS transistors 113 and 114 and a ground terminal GND, N channel MOS transistors 117 and 118 are disposed, respectively. The ground terminal GND is grounded.

The input selection circuit 110 is further provided with first, second and third comparators 121, 122 and 123, and a reference voltage source 124. A plus input terminal of the first comparator 121 is connected to a cathode of the diode 111, and a minus input terminal of the first comparator 121 is connected to the reference voltage source 124. A plus input terminal of the second comparator 122 is connected to a cathode of the diode 112, and a minus input terminal of the second comparator 122 is connected to the cathode of the diode 111. A plus input terminal of the third comparator 123 is connected to the reference voltage source 124, and a minus input terminal of the third comparator 123 is connected to the cathode of the diode 112.

Outputs of those three comparators 121, 122 and 123 are transmitted via a first logical circuit 133 comprising an AND gate 131 and an OR gate 132 to the N channel MOS transistor 117, and further transmitted via a second logical circuit 136 comprising an OR gate 134 and a NAND gate 135 to another N channel MOS transistor 118.

The first comparator 121 compares voltage Vin1 of the first input terminals IN1 with the voltage of the reference voltage source 124, and determines whether the voltage Vin1 of the first input terminals IN1 is higher than the voltage of the reference voltage source 124. In other words, it is determined whether the reference voltage source 124 is connected to the first input terminals IN1.

In a similar fashion to that of the first comparator 121, the third comparator 123 compares voltage Vin2 of the second input terminals IN2 with the voltage of the reference voltage source 124, and determines whether the voltage Vin2 of the second input terminals IN2 is higher than the voltage of the reference voltage source 124. In other words, it is determined whether the reference voltage source 124 is connected to the second input terminals IN2.

The second comparator 122 is different from the first comparator 121 and the third comparator 123, and compares the voltage Vin1 of the first input terminal IN1 with the voltage Vin2 of the second input terminal IN2.

When the voltage Vin1 of the first input terminal IN1 exceeds the reference voltage and Vin1<Vin2, the first logical circuit 133 generates an 'H' level of signal, so that the NMOS transistor 117 conducts and the potential of the gate of the PMOS transistor 113 decreases to the potential of the ground side. Thus the PMOS transistor 113 turns on, so that the voltage Vin1 of the first input terminal IN1 is transmitted via the node TML to the linear regulator section 10. At that time, the output (the gate of the NMOS transistor 118) of the second logical circuit 136 transitions to the 'L' level, so that the NMOS transistor 118 turns off. Thus the PMOS transistor 114 also turns off, so that the voltage Vin2 of the second input terminal IN2 is not transmitted to the linear regulator section 10.

For example, it is assumed that Vin1=5.0 V, Vin2=16.0 V. In the event that the linear regulator section 10 outputs voltage of 3.3 V, the input selection circuit 110 selects Vin1=5.0 V. Thus, the efficiency of the linear regulator section 10 is 66%.

On the other hand, in the case of Vin2<Vin1, when Vin2 exceeds the reference voltage, the output of the first logical circuit 133 transitions to the 'L' level, and the second logical circuit 136 transitions to the 'H' level. Thus, the NMOS transistor 117 and the PMOS transistor 113 turn off, so that transfer of Vin1 to the linear regulator section 10 is inhibited, and the NMOS transistor 118 and the PMOS transistor 114 turn on, so that Vin2 is transferred to the linear regulator section 10. In this case, for example, assuming that Vin1=16.0 V, Vin2=5.0 V and the linear regulator section 10 outputs voltage of 3.3 V, the input selection circuit 110 selects Vin2=5.0 V. Thus, the efficiency of the linear regulator section 10 is 66%.

In the event that Vin2 is less than the reference voltage (typically the input terminal IN2 is disconnected with the source), while Vin1 is not less than the reference voltage, the first, second and third comparators 121, 122 and 123 transition to the 'H' level, 'L' level, and 'H' level of signals, respectively, so that the first logical circuit 133 generates an 'H' level of signal, and the second logical circuit 136 generates an 'L' level of signal. Thus, the NMOS transistor 117 conducts and the PMOS transistor 113 also conduct. On the other hand, the NMOS transistor 118 turns off and the PMOS transistor 114 also turns off. Consequently, in this case, the voltage Vin1 entered through the first input terminal IN1 is transmitted to the linear regulator section 10. In the event that the linear regulator section 10 outputs a voltage of 3.3 V, the efficiency of the linear regulator section 10 is 66% when Vin1=5.0 V, and is 20% when Vin1=16.0 V.

On the other hand, in the event that Vin1 is less than the reference voltage (typically the input terminal IN1 is disconnected with the source) while Vin2 is not less than the reference voltage, the first, second and third comparators 121, 122 and 123 transition to the 'L' level, 'H' level, and 'L' level of signals, respectively, so that the first logical circuit 133 generates an 'L' level of signal, and the second logical circuit 136 generates an 'H' level of signal. Thus, the NMOS transistor 117 turns off and the PMOS transistor 113 also turns off. On the other hand, the NMOS transistor 118 turns on and the PMOS transistor 114 also turns on. Consequently, in this case, the voltage Vin2 entered through the second input terminal IN2 is transmitted to the linear regulator section 10. In the event that the linear regulator section 10 outputs voltage of 3.3 V, the efficiency of the linear regulator section 10 is 66% when Vin2=5.0 V and 20% when Vin2= 16.0 V.

Figure 7:
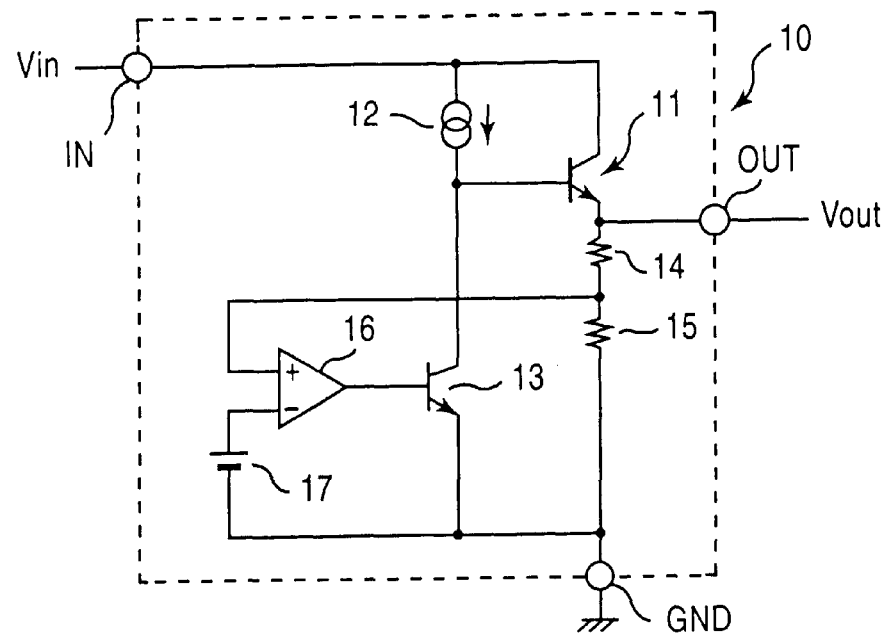
FIG. 7 is a circuit diagram showing a first conventional example of a linear regulator.
Figure 8:
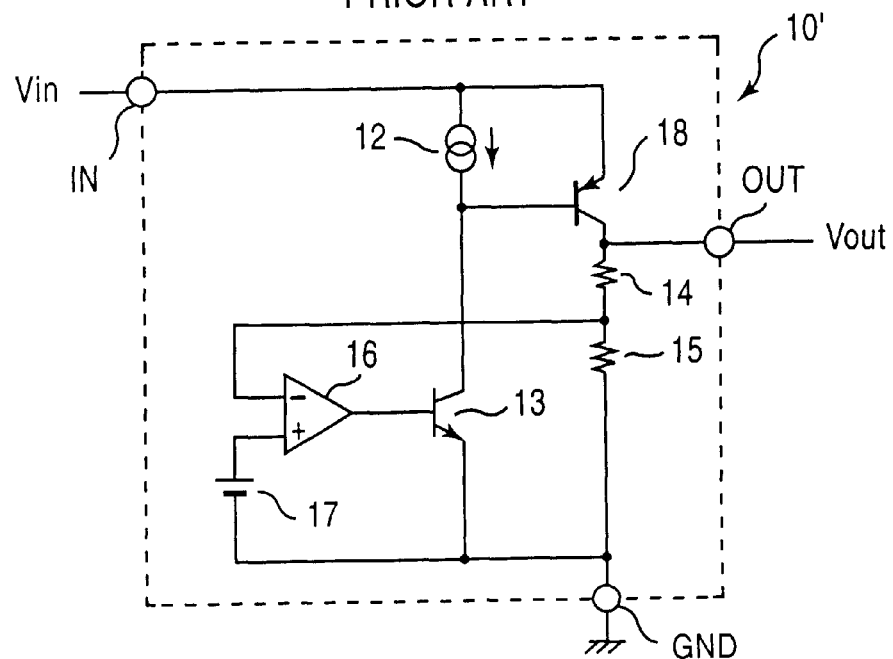
FIG. 8 is a circuit diagram showing a second conventional example of a linear regulator.
Figure 9:
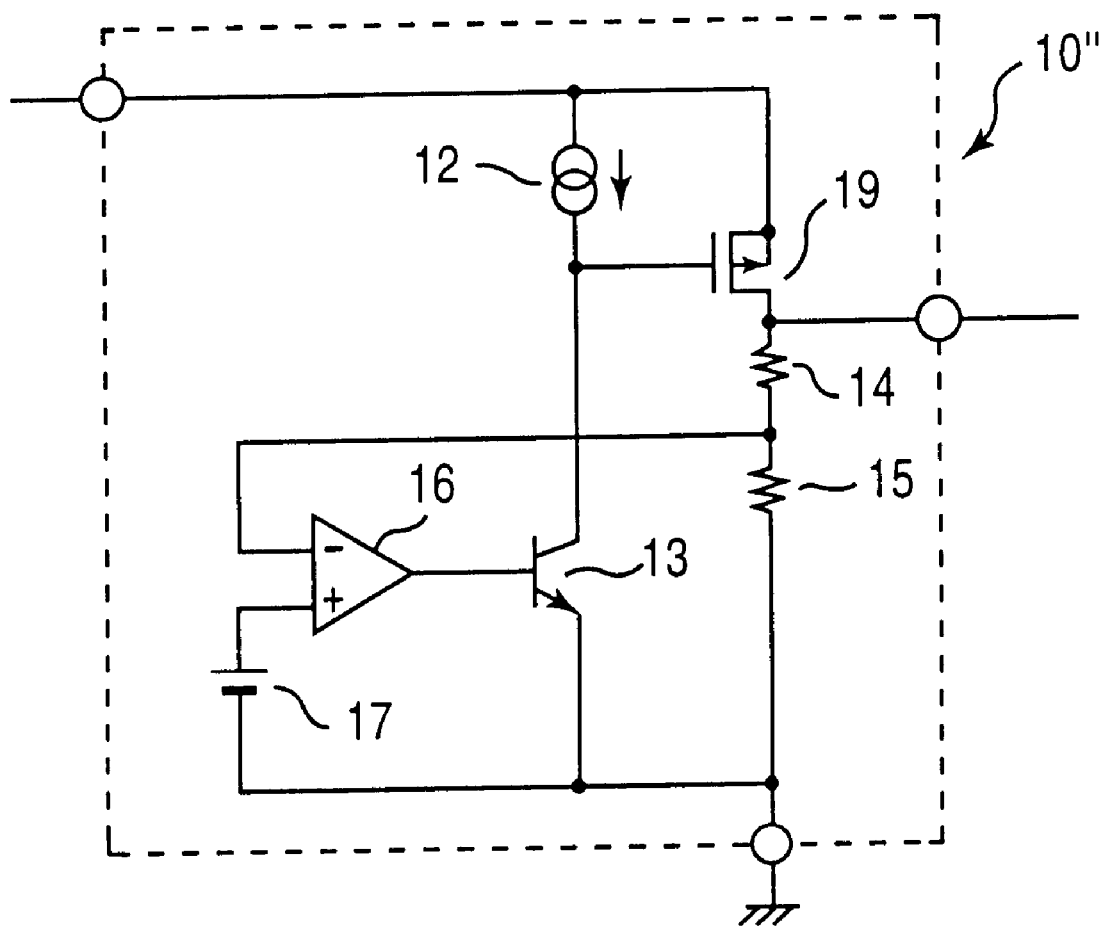
FIG. 9 is a circuit diagram showing a third conventional example of a linear regulator.

The linear regulator section 10 has the same structure as the linear regulator shown in FIG. 7, and it generates in accordance with the principle explained referring to FIG. 7 the stabilized output voltage Vout (Vout<Vin1, Vin2) lower than voltages Vin1 and Vin2 of the input terminals IN1 and IN2. For example, Vout=3.3 V, and the output is the same through the output terminal OUT.

In this manner, in case of the DC-DC converter circuit 100 shown in FIG. 1, of two input voltages Vin1 and Vin2, the smaller one is transmitted to the linear regulator section 10 so as to be used for generating the output voltage Vout, on the condition that it is not less than the reference voltage. Thus, it is possible to perform a DC-DC conversion improved in conversion efficiency.

Figure 2:
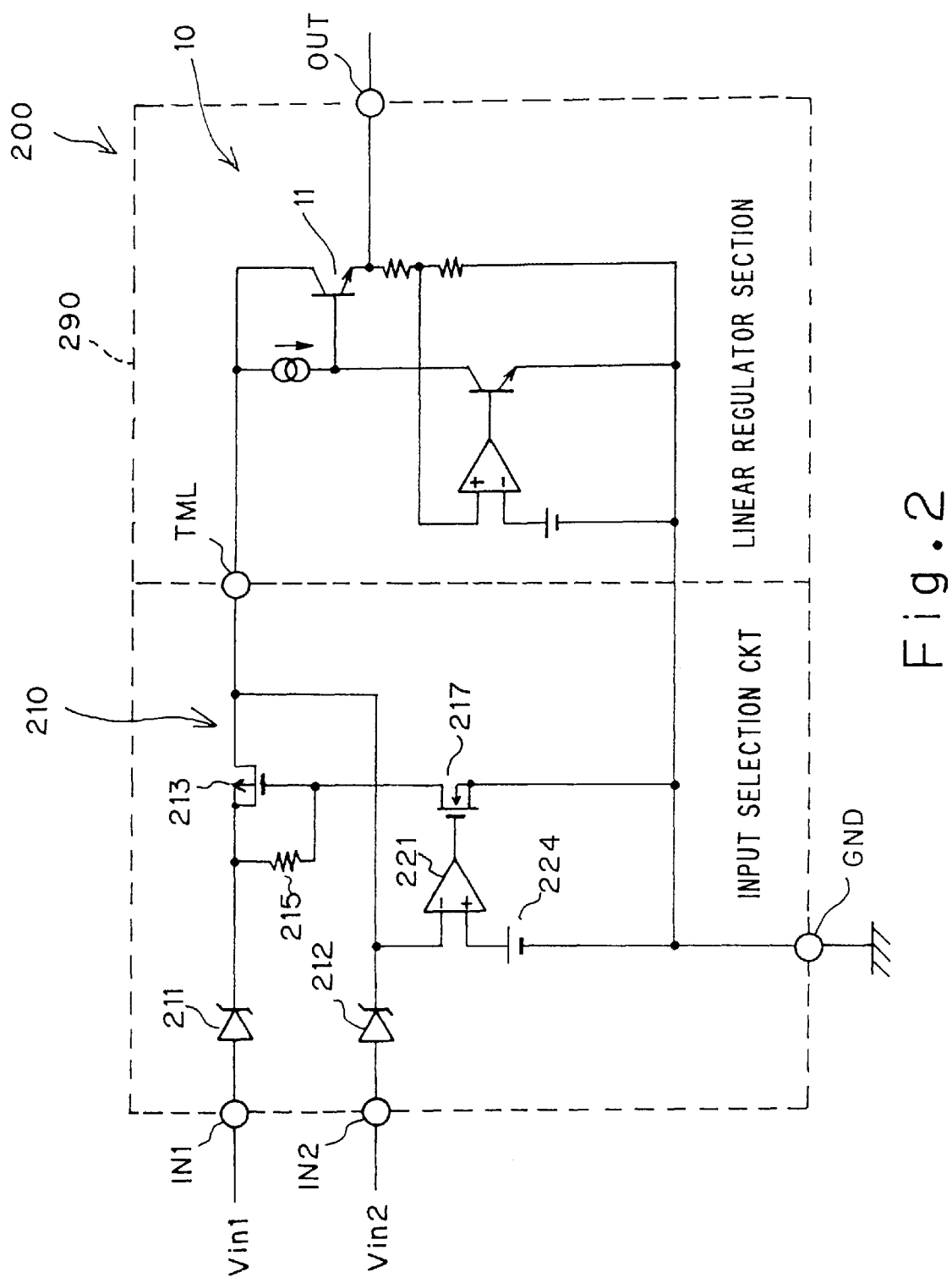
FIG. 2 is a circuit diagram of a second embodiment of a DC-DC converter circuit according to the present invention, including a second embodiment of a power supply selection circuit according to the present invention.

FIG. 2 is a circuit diagram of a second embodiment of a DC-DC converter circuit according to the present invention, including a second embodiment of a power supply selection circuit according to the present invention.

A DC-DC converter circuit 200 shown in FIG. 2 comprises an input selection circuit 210 which is more simplified in structure as compared with the input selection circuit 110 according to the first embodiment shown in FIG. 1, and a linear regulator section 10 which has the same structure as the linear regulator section 10 according to the first embodiment shown in FIG. 1. In a similar fashion to that of the first embodiment shown in FIG. 1, the DC-DC converter circuit 200 is loaded onto a one LSI chip 290 in its entirety.

The DC-DC converter circuit 200 is a circuit wherein it is intended to receive input voltages Vin1 and Vin2 through the input terminals IN1 and IN2, respectively, ensuring Vin1>Vin2. Assuring that Vin1 is greater than Vin2 may be implemented by means of, for example, differentiating types of connectors, or fixedly wiring the respective connectors in an apparatus beforehand.

Between the first input terminal IN1 of the two input terminals IN1 and IN2 and a node TML coupling between the input selection circuit 210 and the linear regulator section 10, there are disposed a diode 211 of which an anode is connected to the input terminal IN1 and a PMOS transistor 213. Here, in the event that the input selection circuit (an example of the power supply selection circuit referred to in the present invention) is arranged in form of a circuit separated from the linear regulator section 10 (for example, only the input selection circuit 210 is loaded on a one LSI chip), the node TML is an output terminal of the input selection circuit 210. The gate of the PMOS transistor 213 is connected via a resistance 215 to the diode 211. Between the gate of the PMOS transistor 213 and the ground terminal GND, an NMOS transistor 217 is disposed. The ground terminal GND is grounded.

Between another input terminal IN2 and the node TML, a diode 212 is disposed, an anode of which is connected to the input terminal IN2. A cathode of the diode 212 is connected to a minus input terminal of a comparator 221. A reference voltage source 224 is connected to a plus input terminal of the comparator 221. An output of the comparator 221 is connected to a gate of the NMOS transistor 217.

The comparator 221 compares the voltage Vin2 of the input terminal IN2 with a reference voltage obtained by the reference voltage source 224. This comparison is for a determination as to whether the reference voltage source 224 is surely connected to the second input terminal IN2.

When the voltage Vin2 is higher than the reference voltage, the output of the comparator 221 offers 'L' level, so that the NMOS transistor 217 turns off. Thus, the PMOS transistor 213 also turns off. As a result, the voltage Vin1 of the first input terminal IN1 is not transmitted to the linear regulator section 10, but the voltage Vin2 of the second input terminal IN2 is transmitted to the linear regulator section 10. On the other hand, in the event that the voltage Vin2 of the second input terminal IN2 transitions to a voltage (typically 0 V) lower than the reference voltage, for example, such cases that the source is not connected to the second input terminal IN2, or that the source connected to the second input terminal IN2 is in condition of turn-off, the output of the comparator 221 transitions to an 'H' level, so that the NMOS transistor 217 turns on. Thus, the PMOS transistor 213 also turns on. As a result, the voltage Vin1 of the first input terminal IN1 is transmitted to the linear regulator section 10.

As mentioned above, the input selection circuit 210 shown in FIG. 2 is effective in the event that the condition of Vin1>Vin2 is satisfied. When the voltage Vin2 is effective, the voltage Vin2 is transmitted to the linear regulator section 10. When the voltage Vin2 is not effective (e.g. 0 V), the voltage Vin1 is transmitted to the linear regulator section 10.

The linear regulator section 10 is the same as the linear regulator section shown in FIG. 1 in structure, and generates the stabilized output voltage Vout lower than voltages Vin1 and Vin2 of the input terminals IN1 and IN2, and outputs the same through the output terminal OUT.

In this manner, also in the case of the DC-DC converter circuit 200, when the voltage Vin2 of the voltages Vin1 and Vin2 (voltages Vin1>Vin2) is sufficient, the voltage Vin2 is transmitted to the linear regulator section 10 to be used for generation of the output voltage Vout. Thus, it is possible to perform a DC-DC conversion improved in conversion efficiency.

Figure 3:
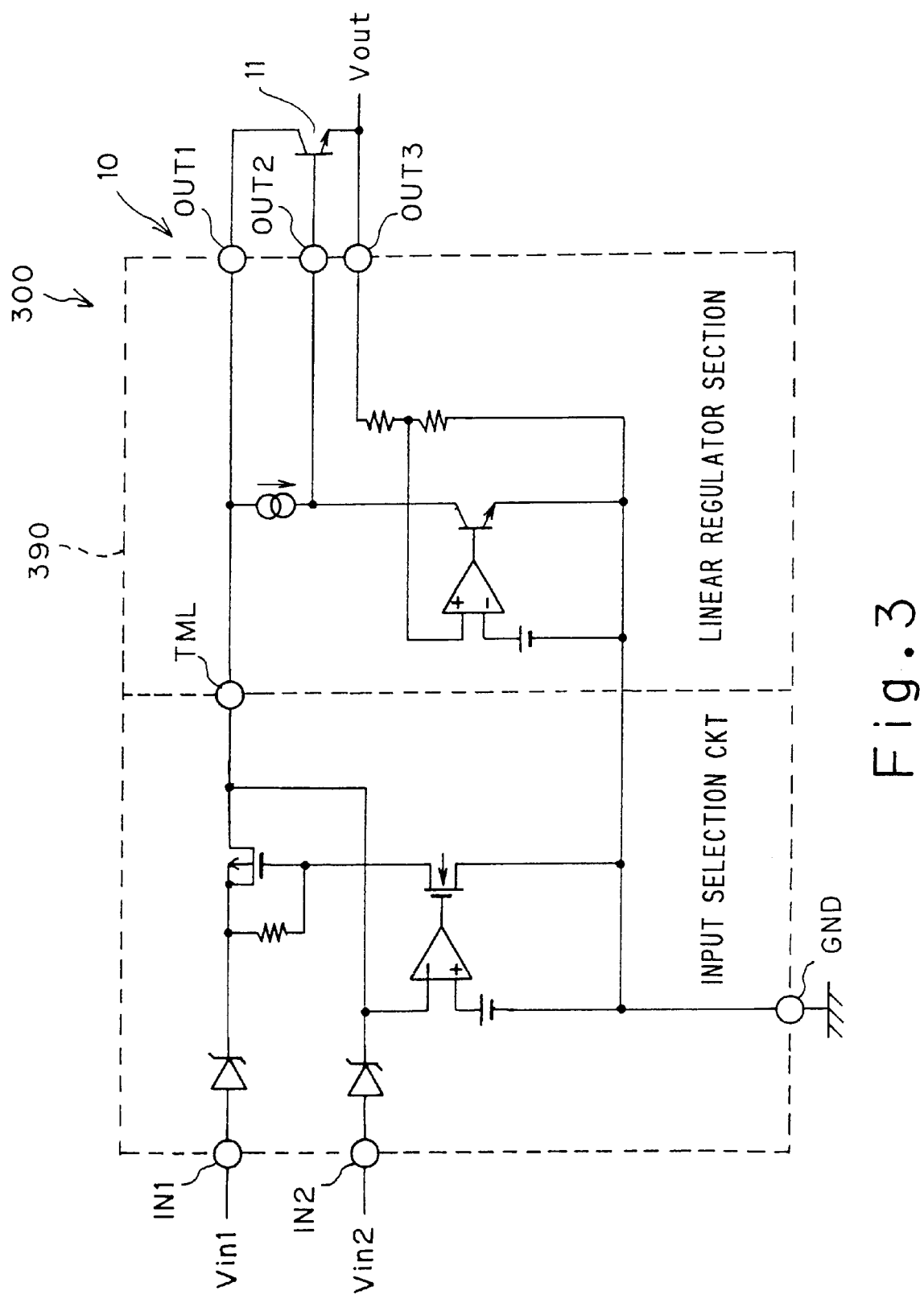
FIG. 3 is a circuit diagram of a third embodiment of a DC-DC converter circuit according to the present invention.

FIG. 3 is a circuit diagram of a third embodiment of a DC-DC converter circuit according to the present invention. Described now are features different from those of the second embodiment shown in FIG. 2.

A different feature of a DC-DC converter circuit 300 from the second embodiment shown in FIG. 2 resides in that a portion, not an NPN transistor 11, of the output voltage control section constituting the linear regulator section 10 is loaded onto an LSI chip 390, and the NPN transistor 11 is disposed outside the LSI chip 390. Thus, the LSI chip 390 needs two output terminals OUT1 and OUT2 in addition to an output terminal OUT3 corresponding to the output terminal OUT in the second embodiment shown in FIG. 2.

The operation of the circuit is the same as that of the second embodiment shown in FIG. 2, and thus redundant explanation will be omitted. The reason why the transistor 11 is disposed outside the LSI chip 390 is as follows. The DC-DC converter circuit 300 is of a large current capacity so that the secondary end thereof is permitted to consume a very large electric power, and thus as the transistor 11, there is a need to use a transistor which is capable of withstanding consumption of the large electric power. In view of the above-mentioned matter, a large capacity of transistor is needed as the transistor 11, and in addition, there is a need to perform a heat radiation by installing, for example, a heat sink and the like. That is, the transistor 11 is not suitable for incorporation into the LSI chip.

Thus, in a DC-DC converter circuit of a linear regulator scheme, it happens that a transistor for the output voltage control is mounted outside.

Figure 4:
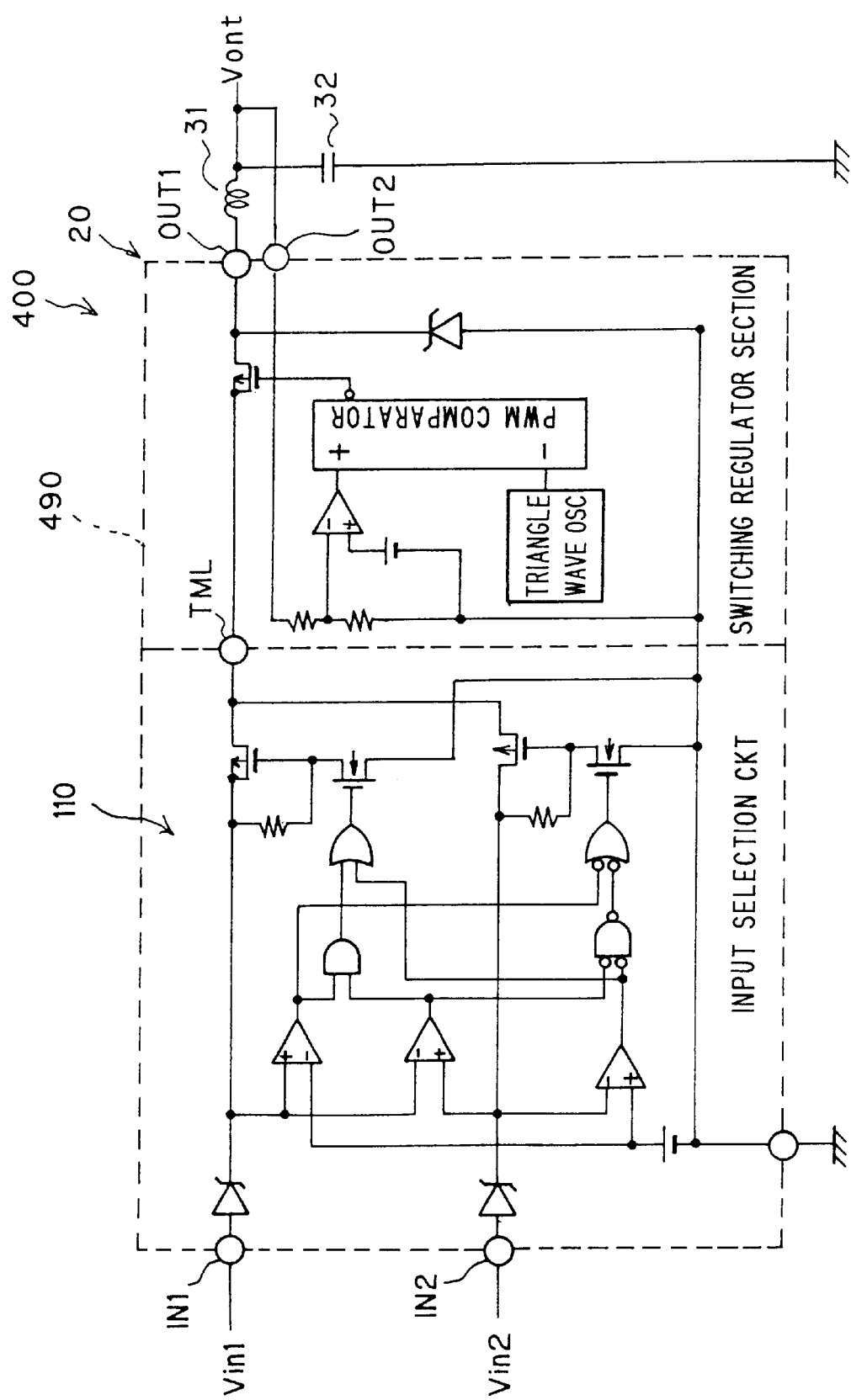
FIG. 4 is a circuit diagram of a fourth embodiment of a DC-DC converter circuit according to the present invention.

FIG. 4 is a circuit diagram of a fourth embodiment of a DC-DC converter circuit according to the present invention.

Figure 10:
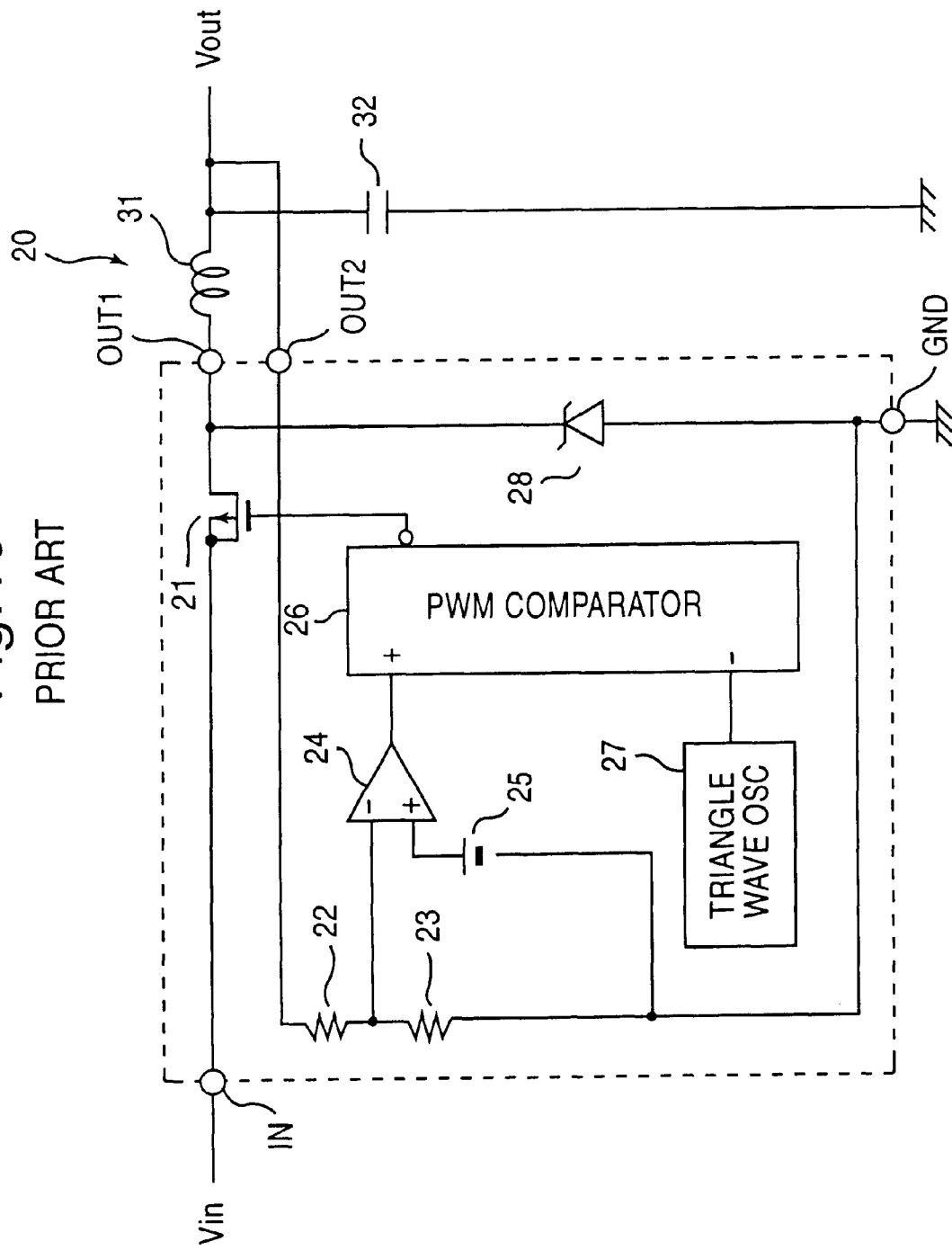
FIG. 10 is a circuit diagram showing a conventional example of a switching regulator.

A DC-DC converter circuit 400 shown in FIG. 4 also comprises an input selection circuit 110, which is the first embodiment of the power supply selection circuit of the present invention also shown in FIG. 1, and a switching regulator section 20 which is the same as the switching regulator shown in FIG. 10. The circuit operation of the input selection circuit 110 and the switching regulator section 20 has been already explained, and thus redundant explanation is omitted. The DC-DC converter circuit 400 shown in FIG. 4 is loaded on an LSI chip 490, except for a coil 31 and a capacitor 32, which are part of the switching regulator 20. The coil 31 and the capacitor 32 are considerably large and are not suitable for placement on the LSI chip.

The input selection circuit 110 receives two input voltages Vin1 and Vin2 (it is acceptable that either of the input voltages Vin1 and Vin2 may be a low voltage) applied through the two input terminals IN1 and IN2, respectively. Of the two input voltages Vin1 and Vin2, the lower voltage is applied to a switching regulator section 20 on the condition that the lower voltage is not less than the reference voltage. The switching regulator section 20 is of a step-down type of regulator for generating an output voltage Vout which is lower than the voltages Vin1 and Vin2. Thus, it is preferable for conversion efficiency that the output voltage Vout is generated in accordance with the lower input voltage (if, of course, it is not less than the output voltage Vout). In this manner, also in the embodiment shown in FIG. 4, there is adopted a scheme wherein of the input voltages Vin1 and Vin2, the lower voltage is applied to generate the output voltage Vout, and thereby implementing the more efficient DC-DC conversion.

Figure 5:
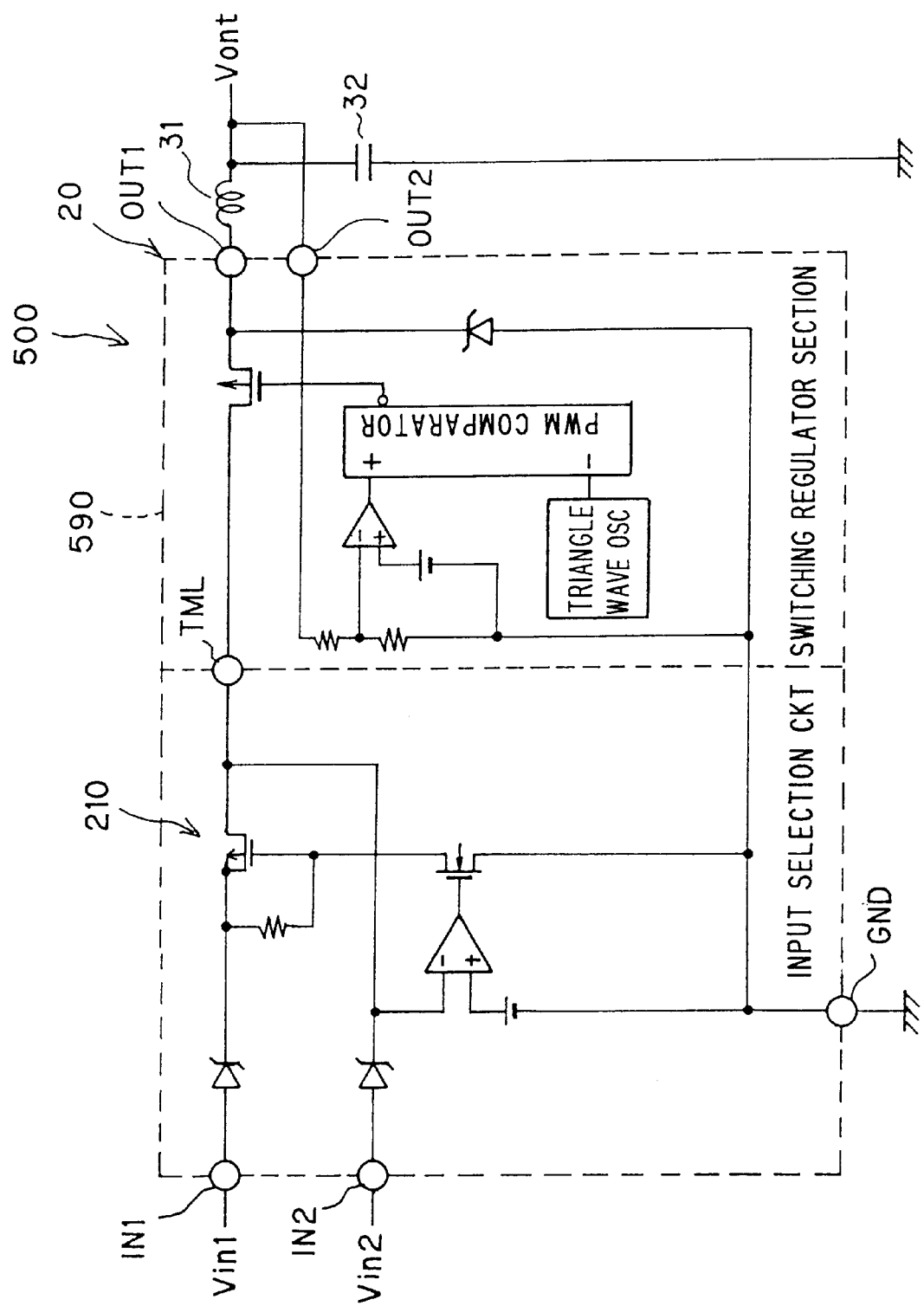
FIG. 5 is a circuit diagram of a fifth embodiment of a DC-DC converter circuit according to the present invention.

FIG. 5 is a circuit diagram of a fifth embodiment of a DC-DC converter circuit according to the present invention.

A DC-DC converter circuit 500 shown in FIG. 5 comprises the input selection circuit 210 corresponding to the second embodiment of the power supply selection circuit of the present invention shown in FIG. 2, and the switching regulator section 20 which is the same as the switching regulator section 20 shown in FIG. 20. The circuit operation of the input selection circuit 210 and the switching regulator section 20 have already been explained, and thus redundant explanation is omitted. The DC-DC converter circuit 500 shown in FIG. 5 is loaded on an LSI chip 590, except for a coil 31 and a capacitor 32, which are part of the switching regulator section 20, in a manner similar to that of the fourth embodiment shown in FIG. 4.

In the input selection circuit 110, when the sources are both of the two input terminals IN1 and IN2, the inequality Vin1>Vin2 is always satisfied. In the event that the input voltage Vin2 is not less than a predetermined reference voltage, the input voltage Vin2 is transmitted to the switching regulator section 20. And on the other hand, in the event that the input voltage Vin2 is not more than the predetermined reference voltage, the input voltage Vin1 is transmitted to the switching regulator section 20. Therefore, in the switching regulator section 20, it is possible to perform a more efficient DC-DC conversion.

Figure 6:
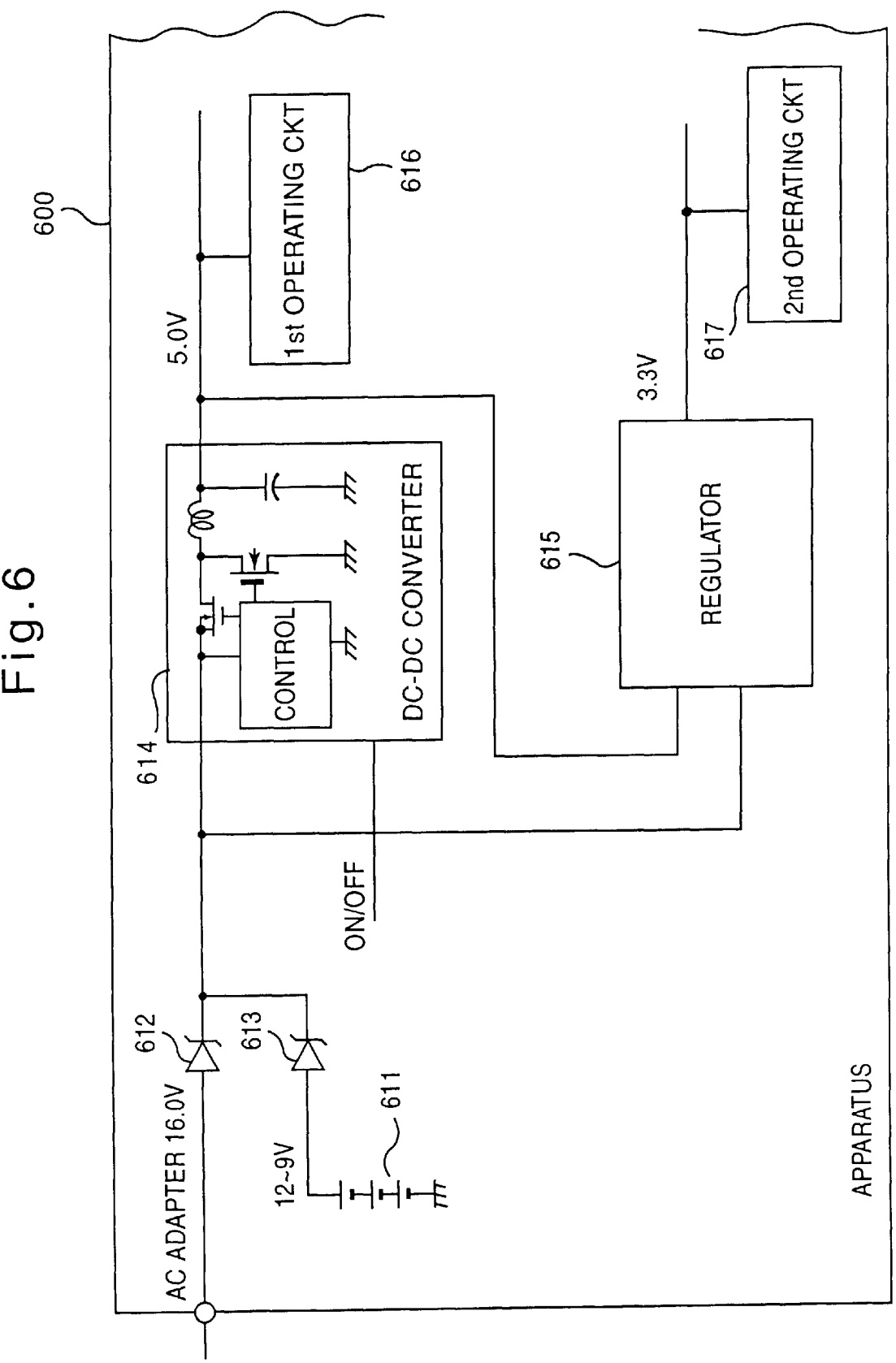
FIG. 6 is a block diagram showing an embodiment of an apparatus according to the present invention.

FIG. 6 is a block diagram showing an embodiment of an apparatus according to the present invention.

An apparatus 600, for example, a personal computer, is supplied with DC power of 16.0 V generated from a commercial power supply in an external AC adapter (not illustrated), and DC power of 12 to 9 V generated from an internal battery 611, through diodes 612 and 613, respectively. Since the DC power (16.0 V) from the external AC adapter is higher than the voltage (12 to 9 V) of the battery, when the DC power is supplied from the AC adapter, the power from the battery is not supplied to the apparatus due to operation of the diode 613. On the other hand, when no power is supplied from the AC adapter, and the apparatus 600 is operating, power is supplied from the battery 611. The power from the AC adapter or the battery 611 is fed to a DC-DC converter 614 (for example, the first DC-DC converter referred to in the present invention) and a regulator 615 (for example, the second DC-DC converter referred to in the present invention)

The DC-DC converter 614 supplies 5.0 V of electric power to a first operating circuit 616. The first operating circuit 616 is driven by the power of 5.0 V generated from the DC-DC converter 614. The DC-DC converter 614 receives a control signal (an on/off signal) for turning on and off the DC-DC converter, so that the DC-DC converter 614 may stop operating for the purpose of saving power when there is no need for the first operating circuit 616 to operate.

The regulator 615 receives power of 5.0 V from the DC-DC converter 614 received from either the AC adapter or the battery 611, and supplies power of 3.3 V in accordance with lower power of the received two types of power. The power of 3.3 V from the regulator 615 is supplied to a second operating circuit 617. The second operating circuit 617 is activated by the power of 3.3 V supplied from the regulator 615. The second operating circuit 617 comprises circuits and the like which are needed to be kept operating on an interruptible power supply basis.

While it is acceptable that as the regulator 615, any one of the above-mentioned embodiments of DC-DC converter circuit may be adopted, typically, the DC-DC converter circuit shown in FIG. 2 is adopted because it is wired beforehand, since it is incorporated into the apparatus.

When the DC-DC converter 614 operates, and the power of 5.0 V generated from the DC-DC converter 614 is fed to the regulator 615, the regulator 615 generates power of 3.3 V from an input power of 5.0 V. When the DC-DC converter 614 stops operating, the regulator 615 generates power of 3.3 V in accordance with the power of 16.0 V from the AC adapter or the power of 12 to 9 V from the battery 611 when the AC adapter is not connected.

In this manner, the regulator 615 is so arranged that when the DC-DC converter 614 operates, the power of 3.3 V is generated from the power of 5.0 V generated from the DC-DC converter 614. Thus, as compared with the case where, regardless of the fact that the DC-DC converter operates, the power from the AC adapter or the battery is used, it is possible to save more power.

Incidentally, as the regulator 615, it is acceptable to use the DC-DC converter circuit shown in FIG. 1. In this case, it is acceptable to connect the input and the output of the DC-DC converter 614 to either of the two input terminals of the regulator 615. This feature simplifies the wiring work, and also may prevent the miswiring that may otherwise occur when the two wires are erroneously connected.

As mentioned above, the present invention makes possible higher efficiency of DC-DC conversion.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A DC-DC converter circuit having a plurality of input terminals connected to a plurality of DC power supplies, and an output terminal, said DC-DC converter circuit comprising:
   a power supply selection section for selecting a DC power supply of lowest voltage on condition that the voltage is not less than a predetermined voltage; and
   a step-down type of regulator section for converting the voltage of the DC power supply selected by said power supply selection section into a predetermined voltage lower than the voltage of the DC power supply selected by said power supply selection section, and outputting the converted voltage through said output terminal.

2. A DC-DC converter circuit having a first input terminal connected to a predetermined first DC power supply, and a second input terminal connected to a predetermined second DC power supply of which voltage is lower than a voltage of said first DC power supply, and an output terminal, said DC-DC converter circuit comprising:
   a power supply selection section for selecting the first DC power supply connected to said first input terminal and the second DC power supply connected to said second input terminal according as the voltage of the second DC power supply is less than a predetermined voltage or is not less than the predetermined voltage, respectively; and
   a step-down type of regulator section for converting the voltage of the DC power supply selected by said power supply selection section into a predetermined voltage lower than the voltage of the DC power supply selected by said power supply selection section, and outputting the converted voltage through said output terminal.

3. A DC-DC converter circuit according to claim 1, wherein said regulator section comprises a linear regulator.

4. A DC-DC converter circuit according to claim 2, wherein said regulator section comprises a linear regulator.

5. A DC-DC converter circuit according to claim 3, wherein said power supply selection section and said regulator section comprising the linear regulator are arranged in an integrated circuit chip.

6. A DC-DC converter circuit according to claim 4, wherein said power supply selection section and said regulator section comprising the linear regulator are arranged in an integrated circuit chip.

7. A DC-DC converter circuit according to claim 3, wherein said power supply selection section and portions of said regulator section comprising the linear regulator are arranged in an integrated circuit chip, and wherein said regulator section includes an output voltage control transistor which is to be disposed outside said integrated circuit chip.

8. A DC-DC converter circuit according to claim 4, wherein said power supply selection section and portions of said regulator section comprising the linear regulator are arranged in an integrated circuit chip and wherein said regulator section includes an output voltage control transistor which is to be disposed outside said integrated circuit chip.

9. A DC-DC converter circuit according to claim 1, wherein said regulator section comprises a switching regulator.

10. A DC-DC converter circuit according to claim 2, wherein said regulator section comprises a switching regulator.

11. A DC-DC converter circuit according to claim 9, wherein said power supply selection section and portions of said regulator section comprising the switching regulator are arranged in an integrated circuit chip, and wherein said regulator section includes a voltage smoothing circuit portion which is to be disposed outside said integrated circuit chip.

12. A DC-DC converter circuit according to claim 10, wherein said power supply selection section and portions of said regulator section comprising the switching regulator are arranged in an integrated circuit chip, and wherein said regulator section includes a voltage smoothing circuit portion which is to be disposed outside said integrated circuit chip.

13. A power supply selection circuit comprising:
   a plurality of input terminals connected to a plurality of DC power supplies;
   a power supply selection section for selecting a DC power supply of lowest voltage, on condition that the voltage is not less than a predetermined voltage, from among the plurality of DC power supplies; and
   an output terminal for outputting the voltage of the DC power supply selected by said power supply selection section.

14. A power supply selection circuit comprising:
   a first input terminal connected to a predetermined first DC power supply;
   a second input terminal connected to a predetermined second DC power supply of which voltage is lower than a voltage of said first DC power supply;
   a power supply selection section for selecting the first DC power supply connected to said first input terminal and the second DC power supply connected to said second input terminal according as the voltage of the second DC power supply is less than a predetermined voltage or is not less than the predetermined voltage, respectively; and
   an output terminal for outputting the voltage of the DC power supply selected by said power supply selection section.

* * * * *